United States Patent [19]

LaPorte et al.

[11] 4,138,997
[45] Feb. 13, 1979

[54] SOLAR HEAT COLLECTOR

[75] Inventors: Gerald E. LaPorte, East Brunswick; Charles L. Osterkorn, North Brunswick; Salvatore M. Marino, East Brunswick, all of N.J.

[73] Assignee: Fedders Corporation, Edison, N.J.

[21] Appl. No.: 828,758

[22] Filed: Aug. 29, 1977

Related U.S. Application Data

[63] Continuation-in-part of Ser. No. 766,955, Feb. 9, 1977.

[51] Int. Cl.² .............................................. F24J 3/02
[52] U.S. Cl. .................................. 126/271; 165/182; 165/184; 29/157.3 AH
[58] Field of Search ............... 126/271; 165/181, 184, 165/182; 29/157.3 A, 157.3 AH

[56] References Cited

U.S. PATENT DOCUMENTS

| 2,471,582 | 5/1949 | Poole | 165/181 |
| 2,540,339 | 2/1951 | Kritzer | 165/181 X |
| 3,752,228 | 8/1973 | Bosse | 165/184 |
| 4,036,208 | 7/1977 | Bauer | 126/271 |

FOREIGN PATENT DOCUMENTS

| 237258 | 4/1945 | Switzerland | 165/181 |
| 340765 | 1/1931 | United Kingdom | 165/181 |
| 799391 | 8/1958 | United Kingdom | 165/184 |

Primary Examiner—Albert W. Davis, Jr.
Attorney, Agent, or Firm—McAulay, Fields, Fisher & Goldstein

[57] ABSTRACT

An improved solar energy collector has a twisted expanded metal/bristle fin combination structure which provides improved energy absorbing efficiency, good peripheral stability, and efficient heat transfer capabilities. The structure is normally formed by wrapping and thereby expanding, a lanced sheet metal about a conduit in a spiral fashion. In the preferred embodiment, the outer peripheral structure presents a series of protrusions wherein every other protrusion is twisted at an angle with respect to the spiraling structure.

12 Claims, 5 Drawing Figures

SOLAR HEAT COLLECTOR

CROSS REFERENCE TO A RELATED APPLICATION

Reference is hereby made to the related copending application Ser. No. 766,955 filed Feb. 9, 1977 by Gerald E. LaPorte, Charles Osterkorn, and Salvatore Marino for a "Heat Transfer Fin Structure," of which the present application is a continuation-in-part. This related application and the present application are commonly assigned.

BACKGROUND OF THE INVENTION

This invention relates to a solar energy collector to be normally fabricated from sheet metal and secured to an object to provide increased effective surface area to the object for enhanced absorption or collection of solar energy impinging on the surface thereof.

The invention relates more particularly to a structure which is related to the structure disclosed in the above-referenced parent application. The related structure is intended as a heat transfer fin structure which not only has unexpectedly high heat transfer efficiency but also has relatively high peripheral stability or resistance to physical deformations, as compared with other similar structures, as is discussed in detail in the above-referenced application. However, it has been found that by modifying the the structure disclosed in the above-referenced parent application, it will operate as an efficient solar energy collector. As can readily be seen from FIG. 4 of the parent application, solar energy impinging upon the structure from a radial direction will only "see" the edge of the spiral fin and therefore will "see" large gaps between these spirals. This clearly will result in less than optimum solar energy collection efficiency. In this respect, it is noted that the above-referenced related application purported to teach a solar energy collector but has now been found, with some modification, to be a highly efficient solar energy collector.

The usual construction employed for a solar energy collector is a combination of a darkened sheet of material presenting a relatively large surface to the sun; and a conduit in heat exchange relationship with that material. Solar energy is absorbed by the large darkened surface which is heated thereby and a fluid flowing through the conduit acts to remove the heat from the surface for use elsewhere. Many different arrangements which substantially have this basic structure have been proposed. U.S. Pat. No. 2,594,232, to Stockstill, shows several possible arrangements of this type which are used to collect solar energy and utilize it to heat a liquid.

Further discussion of these "flat plate" type of collectors, as well as other types of collectors, can be found in "Solar Heating and Cooling," a text by Kreider and Kreith, (Hemisphere Publishing Corp., revised first edition, 1977), especially Chapter 3, which text is incorporated herein by reference.

SUMMARY OF THE INVENTION

The present invention provides a solar energy collector in the form of a bristle fin type of structure. The structure is especially intended to be wrapped or otherwise disposed about a conduit and in heat exchange relationship with the conduit. In such an embodiment, fluid flowing through the conduit may be utilized to remove heat absorbed on the bristle fin structure.

The solar collector structure may be fabricated from materials other than sheet metal and by methods other than wrapping on a conduit. Synthetic polymers, for example, can be fabricated directly into the solar collector structure, without the need for wrapping, and these can be secured to a conduit or flat plate or other structure, as required by the proposed solar collecting device. Similarly, metal can be molded to form the structure directly, or sheets of metal can be directly punched and twisted to form the solar collector structure for use as required. The use of lanced sheet metal, which is expanded by wrapping it on a conduit, is intended only as an example of the presently preferred manner of practicing the present invention.

The solar energy collecting structure will normally be fabricated by providing appropriate slits and folds in a piece of sheet metal and thereafter expanding the structure by wrapping the sheet metal about a conduit.

The expanded structure comprises a plurality of elongated leg portions spaced apart from each other and forming a row; and openings formed in the spaces between the spaced apart leg portions which openings have tab portions extending radially therefrom forming a row coincident with the row formed by the leg portions. The tab portions are twisted at an angle to the row of leg portions. When this structure is wrapped about a conduit, the leg portions will define a spiral surface and each tab portion will pass through the surface and extend to either side thereof.

As is the usual practice with solar energy collectors, the structure should have a darkened surface to enhance its absorption of solar energy. Additionally, solar energy incident upon the structure which is not absorbed, is not completely lost by reflection from the structure as can occur in plate type collectors, but is reflected, at least in part, against other portions of the structure whereby it will be subjected to further absorption.

The structure, when wrapped about a conduit, may be used both in applications wherein rows of wrapped conduit are laid side by side to replace the usual "flat plate" type of collectors and as the collector element in an energy concentrating system such as those that utilize parabolic reflective troughs.

In addition to its improved solar energy collection characteristics, a structure according to the present invention retains the high peripheral stability and high heat transfer efficiency found in the structure described in the above-referenced related application. Thus, when utilized in a closed box type of solar collector system wherein the structure is disposed in a sealed unit having a transparent window, energy lost to the heating of the atmosphere within the closed structure may be reclaimed by heat exchange between the fin structure and the atmosphere. And, additionally, the structure may be advantageously employed in solar collector systems wherein air is heated directly by passage over a heated collector structure. It is easily appreciated that in such a direct air heating system, enhanced heat transfer efficiency between the heated structure and the air passing over it, will result in improved efficiency for the system. A central conduit is, of course, unnecessary for this application.

BRIEF DESCRIPTION OF THE DRAWINGS

Reference is had to the drawings wherein.

DESCRIPTION OF THE PREFERRED EMBODIMENT

Figure 1:
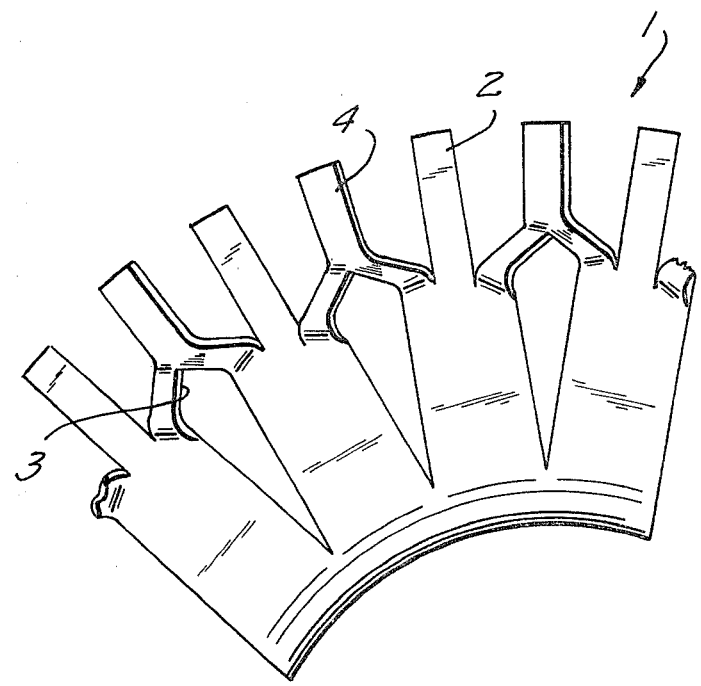
FIG. 1 is an elevational view of a portion of the solar energy collector fin structure, according to the instant invention.

In carrying the invention into effect in one of the embodiments which has been selected for illustration in the accompanying drawings and for description in this specification, and referring now particularly to FIG. 1, a solar energy collector fin structure 1 has a plurality of elongated leg portions or spikes 2 which are spaced apart from each other; and openings 3, having radially extending tab portions 4, formed in the space between adjacent elongated leg portions 2.

Figure 2:
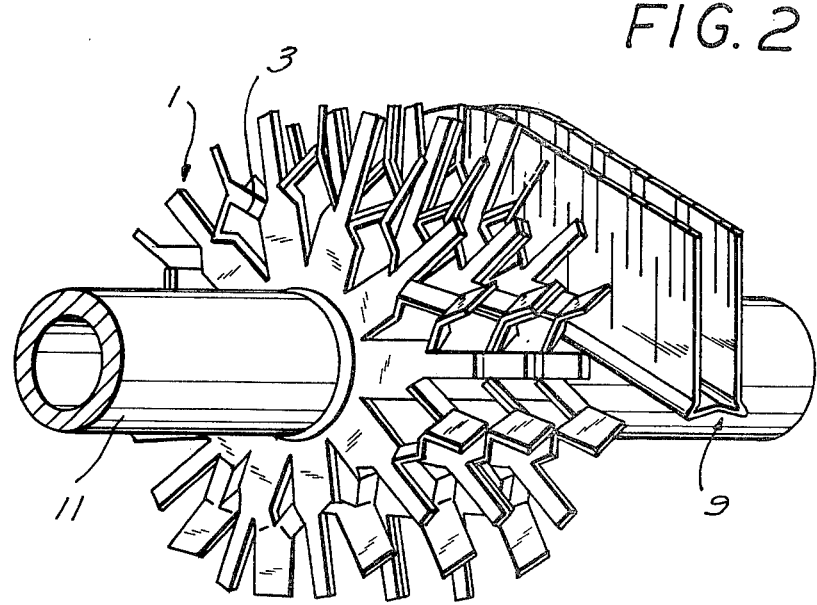
FIG. 2 is a perspective view of a solar energy collector structure according to the instant invention, which is in part secured to a conduit and in part is in position for being wrapped unto the conduit.
Figure 4:
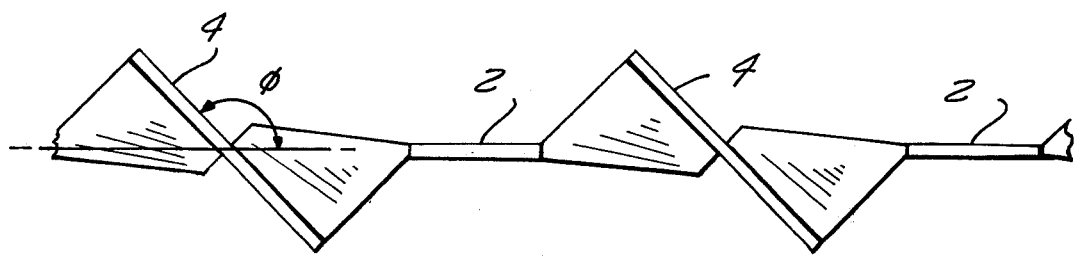
FIG. 4 is a partial top plan view of the solar energy collector fin structure of FIG. 1.

In the preferred embodiment shown in FIGS. 1, 2 and 4, the openings 3 are twisted, as are the tab portions 4, with respect to the plane substantially defined by adjacent leg portions 2. This is shown in FIG. 4 as angle Φ. As shown, the openings preferably have a generally non-symmetrical diamond-like shape wherein the upper portion, as shown in FIG. 1, is twisted out of the plane substantially defined by adjacent leg portions 4.

The solar energy collector fin structure 1 may conveniently be formed by expanding a sheet of metal prepared as described below. It is the twisting of the structure which provides the improved solar energy collector characteristics. Variations in the specific shape of the openings 3, the leg portions 2 and the tab portions 4, from those illustrated herein would be obvious to a worker in the art and are intended to be within the scope of this disclosure.

The structure should be twisted at angle Φ of about 25° to about 60° and preferably 40° to about 45°, for optimal solar energy collection efficiency. If the twist is substantially less than 25°, the sun will not "see" or impinge upon sufficient area of the collector to make it efficient enough for practical purposes. If the twist is substantially greater than 60°, unabsorbed energy will be reflected out of the structure, rather than against other portions thereof, as discussed above, again resulting in an attenuation of efficiency.

Figure 3:
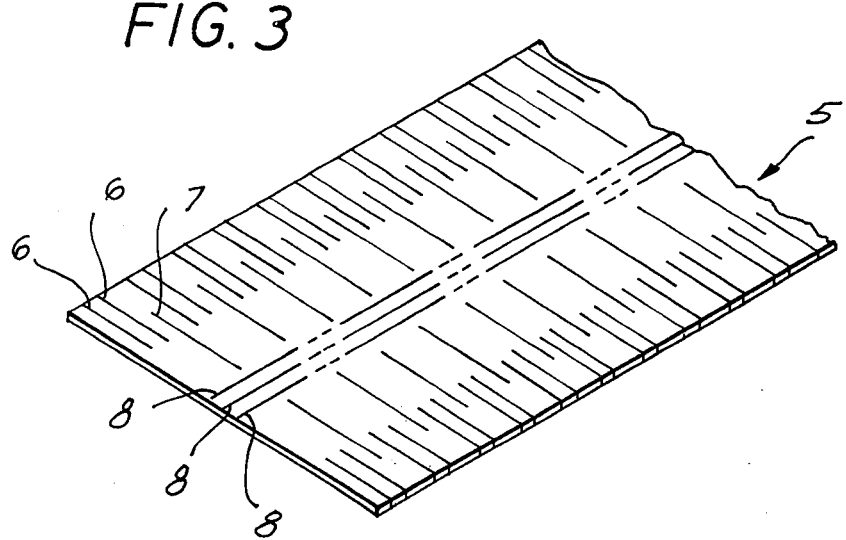
FIG. 3 is a perspective view of a piece of sheet metal which has been provided with slits and folding lines for producing a solar energy collector fin structure according to the instant invention.

By way of illustration of a method for preparing a solar energy collector fin structure according to the present invention, reference is now made to FIG. 3 wherein a sheet of metal 5 is provided with slits 6, 7 by any usual method, such as cutting or stamping. Folding lines 8 may also be provided by any convenient, normally practiced method of the art.

As is illustrated in FIG. 2, the sheet metal piece 5 is thereafter folded along the folding lines 8 into a W-shaped structure 9 and wrapped in a spiral about a conduit 11, again using any convenient conventional means, whereby the sheet metal strip 5 expands to form a structure according to the present invention, as is illustrated in FIGS. 1 and 2.

The procedure described above is substantially the same as the procedure described in the parent application Ser. No. 766,955, discussed above. The preferred structure produced herein is different from that illustrated in the parent application in that a portion of the structure defining the opening 3 is twisted preferably at least 25° to about 60° and most preferably about 40° to about 45°, and has a longer portion or tab 4 extending radially thereof. It is this change in structure which increases the efficiency of the fin structure as a solar energy collector. To obtain this twist in the structure, while substantially employing the method of producing a "flat" structure illustrated in the related application, the distance that slit 7 extends toward the outer edge of the sheet metal strip 5 is shortened. The amount which slit 7 is shortened depends on the size of the fin and the extent to which it is desired to twist the fin. This can easily be determined without undue experimentation by a person of ordinary skill in the art.

By way of example, it has been found that, in order to produce the most preferred 40° to 45° twist in the expanded fin section for a fin which extends about 7/16 of an inch in a radial direction about a pipe or similar conduit of about ⅜" diameter, the length of tab 4, measured from the upper portion of the opening 3, was increased from 31/1000th of an inch, which resulted in a substantially flat structure to 45/1000th of an inch, an increase of about 50% in the length of the tab portion. This results in a structure which was found unexpectedly efficient for solar energy absorption. The actual dimensions, as noted above, depend on the amount of twist desired and additionally on the size of the fin and of the conduit about which it is to be wrapped.

The structure should be darkened to increase its solar energy absorption efficiency, as is usual for solar collectors. It may also be formed, using appropriate techniques, from other materials, for example, appropriate synthetic polymers.

Figure 5:
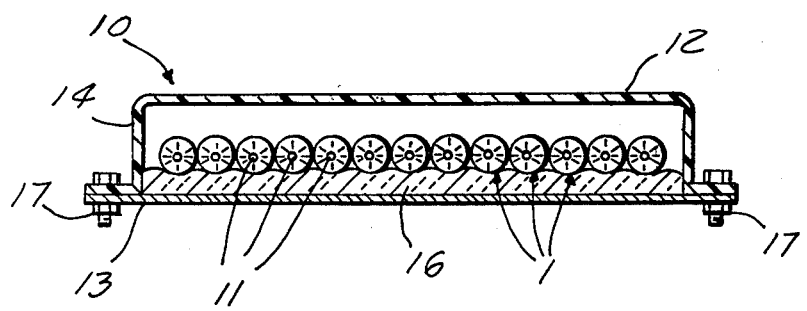
FIG. 5 is a diagrammatic sectional view of a closed box type solar collector utilizing the solar energy collector fin structure according to the present invention.

FIG. 5 shows a typical application wherein a solar energy collector fin structure according to the present invention, disposed about the conduit 11 through which fluid flows in heat exchange relation with the fins, may be employed for the collection of solar energy. The structure shown in FIG. 5 is essentially an enclosure 11 having a transparent window 12, a backing plate or support 13, sidewalls 14 to support the window 12, and a bed of insulating material 16 upon which the solar energy collector fin structure and associated conduits rest. The closures 17 provide convenient access to the interior of the enclosure 11.

The type of structure illustrated in FIG. 5 can also be employed for direct air or other fluid heating, wherein the fluid passes through the structure in heat exchange relation with the outside of the fins to remove heat collected thereon by direct contact, by providing means for passing fluid through the structure. In this embodiment, conduit 11 may be replaced with any suitable support.

While specific embodiments of the article and procedure of the present invention have been shown and described, the invention should not be considered as limited to these specific examples, but only as limited by the appended claims.

What is claimed is:

1. In a solar energy collector fin structure to be secured to and extend from an object to provide increased solar energy absorbtion ability to the object, the improvement comprising:

a plurality of elongated leg portions to absorb incident solar energy and being spaced apart from each other to form a first row, proximate ones of said leg portions substantially defining a plane therebetween; and a plurality of openings defined by said structure, spaced apart from each other, and having radially extending tab portions to absorb incident solar energy;

said tab portions being disposed between at least some of said proximate leg portions and being twisted at an angle of from about 25° to 60° with respect to said plane to direct reflected solar energy against proximate portions of said structure thereby to reduce losses by reflectance from said structure.

2. In a structure as claimed in claim 1, said openings being elongated openings.

3. In a structure as claimed in claim 2, each said opening having a substantially diamond shape and having its normally outwardly extending portion twisted at an angle to said plane.

4. In a structure as claimed in claim 3, wherein said leg portions and said tab portions are alternately distributed along said structure.

5. In combination, a conduit and a solar energy collector fin structure as claimed in claim 4, said fin structure being disposed circumferentially about at least a portion of said conduit.

6. In a structure as claimed in claim 1, wherein said leg portions and said tabs are alternately distributed along said structure.

7. In combination, a conduit and a solar energy collector fin structure as claimed in claim 6, said fin structure being disposed circumferentially about said conduit.

8. In combination, a conduit and a solar energy collector fin structure as claimed in claim 1, said fin structure being disposed circumferentially about at least a portion of said conduit.

9. A structure as claimed in claim 1 composed of sheet metal having a darkened surface.

10. A structure as claimed in claim 1 composed of a synthetic polymer.

11. In a structure as claimed in claim 1, said angle being from about 40° to about 45°.

12. A solar energy collector device comprising in combination:

an enclosure having a transparent window to allow solar energy to pass into the enclosure, a conduit, and a solar energy collector fin structure, said solar energy collector fin structure being disposed circumferentially about said conduit to provide increased solar energy absorbtion ability to said conduit and comprising:

a plurality of elongated leg portions spaced apart from each other and forming a first row, proximate ones of said leg portions substantially defining a plane therebetween; and a plurality of openings defined by said structure, spaced apart from each other and alternating with said leg portions, each said opening having a radially extending tab portion;

each said tab portion being disposed between proximate leg portions and being twisted at an angle of from about 25° to 60° with respect to said plane.

* * * * *